Sept. 18, 1962 D. G. REYNOLDS ETAL 3,054,604
THROTTLE FOR MODEL ENGINES
Filed Aug. 6, 1959

DENNIS G. REYNOLDS
IRVING K. GURNEY
INVENTORS

BY *Ca Snow &Co.*
ATTORNEYS.

3,054,604
THROTTLE FOR MODEL ENGINES
Dennis G. Reynolds and Irving K. Gurney, North Highlands, Calif.; said Reynolds assignor to said Gurney
Filed Aug. 6, 1959, Ser. No. 832,079
1 Claim. (Cl. 261—59)

This invention relates to an air throttle for model aircraft engines.

An object of the present invention is to provide an air throttle for model aircraft engines.

Another object of the present invention is to provide a throttle for varying the air flow to the needle valve of a model aircraft engine.

A further object of the present invention is to provide an air throttle which is capable of varying the r.p.m. output of a model aircraft engine.

An additional object of the present invention is to provide an air throttle for model aircraft engines which will facilitate lower idling speeds of the engine.

Still another object of the present invention is to provide an air throttle for model aircraft engines which will facilitate smooth operation of the engine at low idling speeds.

A still further object of the present invention is to provide an air throttle for model aircraft engines which will obtain higher maximum r.p.m. settings.

Additional objects, advantages and improvements will become apparent from the following specification, taken in connection with the accompanying drawing in which.

Figure 1:
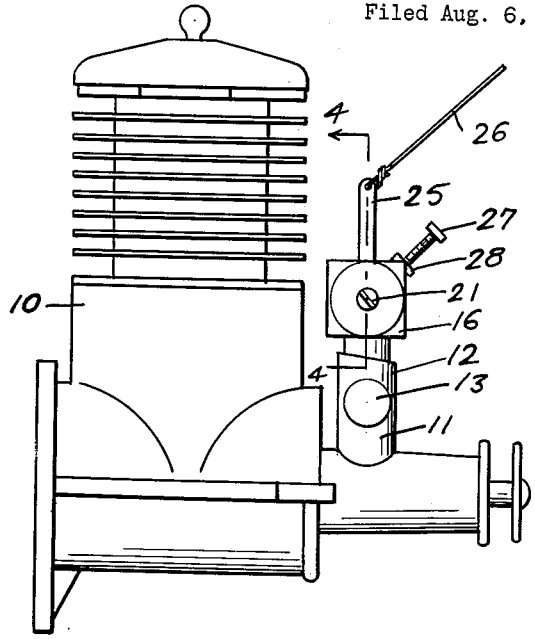
FIGURE 1 is a side elevational view of a model aircraft engine showing an air throttle according to the present invention mounted on the carburetor of the same.
Figure 2:
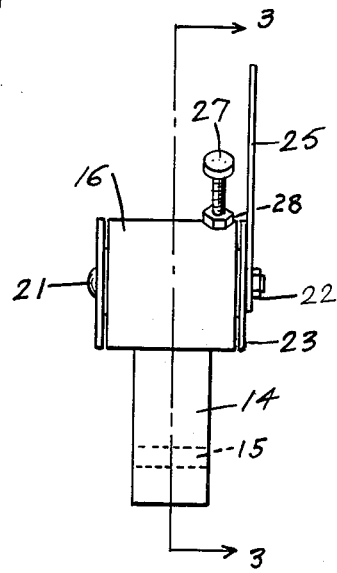
FIG. 2 is an end elevational view of an air throttle according to the present invention.
Figure 3:
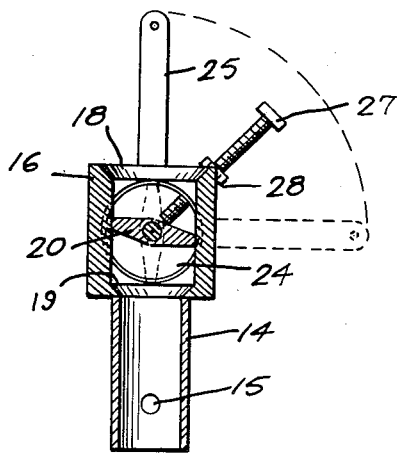
FIG. 3 is a vertical sectional view, taken on the section line 3—3 of FIG. 2 and looking in the direction of the arrows, showing the internal construction of the air throttle.
Figure 4:
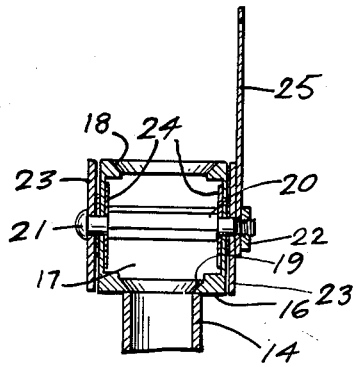
FIG. 4 is also a vertical, sectional view, taken on the section line 4—4 of FIG. 1 and likewise showing the internal construction of the air throttle.

Referring now to the drawings in detail and to FIG. 1 in particular, the reference numeral 10 here designates generally a model aircraft engine having attached thereto a carburetor 11. The carburetor 11 has an air horn 12 thereon and a needle valve 13 projecting into the air horn.

The air throttle according to the present invention is comprised principally by a tube 14 and a valve housing 16. These two elements may be of unitary construction or may be separate elements united in any suitable manner, as by welding. The outer diameter of the tube 14 is so selected that the tube will fit within the air horn 12 by a shifting fit.

Adjacent its bottom the tube 14 has a radially positioned hole 15 in its side wall for a purpose to be later described.

The valve housing 16 is preferably of cubical shape and has formed therein a valve chamber 17, preferably of rectangular or square shape in cross section. At its top the valve housing 16 is chamfered externally at 18, at the entrance of the valve chamber 17, and at its bottom it is chamfered internally at 19, this construction minimizing eddy currents in the air stream flowing through the valve chamber 17.

The rotary valve 20 is shaped in cross section as two truncated wedges in base to base relation. The width of this valve element is slightly less than the transverse dimension of the valve chamber 17. A shaft comprised by a bolt 21 having a nut 22 in its threaded outer end, extends longitudinally of the valve chamber 17 and is force fitted in a suitable cross bore through the rotary valve 20. Exterior bearing plates 23—23 are force fitted on the valve shaft 21, these preferably being discs tangent in outline to the sides of the valve housing 16. Similarly, interior bearing plates 24—24 are force fitted on the valve shaft 21, abutting the rotary valve 20 at its opposite ends.

An arm 25 is secured to one of the interior bearing plates 23 by spot welding or metallic soldering, and a cord 26 is secured in a suitable hole in the outer end of the arm 25, this cord providing for remote control of the air throttle valve. A stop is provided for limiting rotary movement of the valve 20 toward closed position. This stop is comprised by a screw 27 which extends through a suitable diagonally positioned and threaded bore in the valve housing 15 to a point where it is abutted by the rotary valve 20, when the latter is in substantially fully closed or idling position. The screw 27 has thereon a locking nut 28 for holding the same in the desired position.

In use the needle valve 13 is removed from the air horn 12 of the carburetor and the tube 14 is slid within the air horn until the hole 15 in the tube is in alignment with the hole in the air horn through which needle valve normally projects. The needle valve 13 is then put back in place.

While the invention has been described in connection with a model aircraft engine, it should be readily apparent that it is capable of use on other and larger types of engines without any modifications, except for necessary enlargement of the sizes of parts.

Having now fully described my invention, what I claim as new and useful and desire to secure by Letters Patent of the United States is:

An air throttle for model engines having a carburetor, an air horn, and a needle valve projecting into the air horn, said air throttle comprising a substantially square valve housing, an elongated tube extending from said valve housing and having one end in communication with the interior thereof, said tube insertable into the air horn of the carburetor, portions of said tube defining an opening therein in alignment with the needle valve, said valve housing including portions defining a valve chamber, a shaft rotatably mounted in said housing and extending through said valve chamber, a butterfly valve mounted on said shaft and rotatable therewith, said valve having tapered opposite side surfaces, bearing plates mounted on said shaft exteriorly of said valve housing and abutting parallel side walls thereof, an operating arm secured to one of said exterior bearing plates and operable to effect rotation of said valve, and an adjusting screw extending through the wall of said valve housing into the valve chamber and engageable with said valve to limit movement thereof.

References Cited in the file of this patent
UNITED STATES PATENTS

| | | |
|---|---|---|
| 813,077 | Berens | Feb. 20, 1906 |
| 975,696 | Koontz | Nov. 15, 1910 |
| 1,078,592 | Muir | Nov. 11, 1913 |
| 1,405,700 | Welch | Feb. 7, 1922 |
| 1,422,987 | Keith et al. | July 19, 1922 |
| 1,730,268 | Constantinesco | Oct. 1, 1929 |
| 1,772,160 | Seignol | Aug. 5, 1930 |

FOREIGN PATENTS

| | | |
|---|---|---|
| 151,385 | Sweden | of 1955 |